United States Patent
Peng et al.

(10) Patent No.: US 10,863,213 B2
(45) Date of Patent: Dec. 8, 2020

(54) METHOD AND DEVICE FOR CONTROLLING FRAME RATE OF ELECTRONIC DEVICE, STORAGE MEDIUM, AND ELECTRONIC DEVICE

(71) Applicant: Guangdong Oppo Mobile Telecommunications Corp., Ltd., Guangdong (CN)

(72) Inventors: Deliang Peng, Guangdong (CN); Yongpeng Yi, Guangdong (CN); Shengjun Gou, Guangdong (CN); Xiaori Yuan, Guangdong (CN); Gaoting Gan, Guangdong (CN); Zhiyong Zheng, Guangdong (CN); Hai Yang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/565,348

(22) Filed: Sep. 9, 2019

(65) Prior Publication Data
US 2020/0007914 A1    Jan. 2, 2020

Related U.S. Application Data

(63) Continuation of application No. PCT/CN2017/106941, filed on Oct. 19, 2017.

(30) Foreign Application Priority Data

Mar. 10, 2017    (CN) .......................... 2017 1 0142513

(51) Int. Cl.
*H04N 21/00*    (2011.01)
*H04N 21/2343*    (2011.01)
(Continued)

(52) U.S. Cl.
CPC ....... *H04N 21/234381* (2013.01); *G09G 5/12* (2013.01); *G09G 5/30* (2013.01);
(Continued)

(58) Field of Classification Search
CPC ... H04N 21/234381; H04N 21/440281; H04N 21/4621; G09G 5/12; G09G 5/30; G09G 2340/0435
See application file for complete search history.

(56) References Cited

U.S. PATENT DOCUMENTS

| 8,542,221 B1 | 9/2013 | Wyatt et al. |
| 2002/0186212 A1 | 12/2002 | Matsumoto et al. |

(Continued)

FOREIGN PATENT DOCUMENTS

| CN | 103593155 A | 2/2014 |
| CN | 104091579 A | 10/2014 |

(Continued)

OTHER PUBLICATIONS

International search report issued in corresponding international application No. PCT/CN2017/106941 dated Jan. 9, 2018.
(Continued)

*Primary Examiner* — Frank F Huang (57) ABSTRACT

A method and device for controlling a frame rate of an electronic device, and an electronic device are provided. The method includes the following. A frame rate of rendering and a priority of each of target objects currently running on the electronic device are obtained. A synthesizing frame rate of the electronic device is determined according to the frame rate of rendering and the priority of each of the target objects. According to the synthesizing frame rate, respective images rendered by the target objects are synthesized to generate a to-be-displayed image.

14 Claims, 8 Drawing Sheets

(51) Int. Cl.
    *G09G 5/12*        (2006.01)
    *G09G 5/30*        (2006.01)
    *H04N 21/4402*     (2011.01)
    *H04N 21/462*      (2011.01)

(52) U.S. Cl.
    CPC . *H04N 21/440281* (2013.01); *H04N 21/4621* (2013.01); *G09G 2340/0435* (2013.01)

(56) References Cited

U.S. PATENT DOCUMENTS

| | | |
|---|---|---|
| 2013/0039408 A1 | 2/2013 | Cohen et al. |
| 2013/0141642 A1 | 6/2013 | Wu et al. |
| 2013/0159874 A1 | 6/2013 | Bhogal et al. |
| 2015/0293741 A1 | 10/2015 | Glazer |
| 2015/0348496 A1 | 12/2015 | Santos, II et al. |
| 2016/0232872 A1 | 8/2016 | Yoo et al. |
| 2017/0054984 A1* | 2/2017 | Park .................. H04N 19/139 |

FOREIGN PATENT DOCUMENTS

| | | |
|---|---|---|
| CN | 104282286 A | 1/2015 |
| CN | 104714874 A | 6/2015 |
| CN | 104731543 A | 6/2015 |
| CN | 104765594 A | 7/2015 |
| CN | 105611316 A | 5/2016 |
| CN | 105739670 A | 7/2016 |
| CN | 105869560 A | 8/2016 |
| CN | 106095417 A | 11/2016 |
| CN | 106201551 A | 12/2016 |
| CN | 106354455 A | 1/2017 |
| CN | 106412276 A | 2/2017 |

OTHER PUBLICATIONS

Extended European search report issued in corresponding European application No. 17900057.5 dated Feb. 7, 2020.
The first OA with English translation issued in corresponding CN application No. 201710142513.X dated Dec. 10, 2018.

* cited by examiner

METHOD AND DEVICE FOR CONTROLLING FRAME RATE OF ELECTRONIC DEVICE, STORAGE MEDIUM, AND ELECTRONIC DEVICE

CROSS-REFERENCE TO RELATED APPLICATION(S)

This application is a continuation of International Application No. PCT/CN2017/106941, filed on Oct. 19, 2017, which claims priority to Chinese Patent Application No. 201710142513.X, filed on Mar. 10, 2017, the disclosure of both of which are incorporated herein by reference as if reproduced in their entireties.

TECHNICAL FIELD

This disclosure relates to the technical field of electronic devices, and more particularly to a method and device for controlling a frame rate of an electronic device, a storage medium, and an electronic device.

BACKGROUND

With the development of electronic device technology, a variety of electronic devices have become an indispensable tool in people's lives and work. The electronic device presents various display images at different time points by constantly refreshing display images. Synthesizing frame rates of conventional electronic devices are not ideally controlled.

SUMMARY

Implementations of the present disclosure provide a method and device for controlling a frame rate of an electronic device, and an electronic device, which can reasonably control a synthesizing frame rate of the electronic device.

In a first aspect of implementations of the present disclosure, a method for controlling a frame rate of an electronic device is provided. The method includes the following. A frame rate of rendering and a priority of each of target objects currently running on the electronic device are obtained. A synthesizing frame rate of the electronic device is determined according to the frame rate of rendering and the priority of each of the target objects. According to the synthesizing frame rate, respective images rendered by the target objects are synthesized to generate a to-be-displayed image.

In a second aspect of implementations of the present disclosure, an electronic device is provided. The electronic device includes at least one processor and a computer readable storage. The computer readable storage is coupled to the at least one processor and stores at least one computer executable instruction thereon which, when executed by the at least one processor, causes the at least one processor to: obtain a frame rate of rendering and a priority of each of target objects currently running on the electronic device; determine a synthesizing frame rate of the electronic device according to the frame rate of rendering and the priority of each of the target objects; and synthesize, according to the synthesizing frame rate, respective images rendered by the target objects to generate a to-be-displayed image.

In a third aspect of implementations of the present disclosure, a non-transitory computer readable storage medium is provided. The non-transitory computer readable storage medium is configured to store a computer program which, when executed by a processor, causes the processor to carry out following actions. A frame rate of rendering and a weight of each of target objects currently running on an electronic device are obtained, where the weight of each of the target objects is determined according to a priority of each of the target objects. A sum of products is compared with a maximum refresh rate of a display screen of the electronic device, where each of the products is obtained by multiplying the frame rate of rendering of each of the target objects by a corresponding weight. A synthesizing frame rate of the electronic device is determined according to a comparison result between the sum of the products and the maximum refresh rate. According to the synthesizing frame rate, respective images rendered by the target objects are synthesized to generate a to-be-displayed image.

BRIEF DESCRIPTION OF THE DRAWINGS

Taken in combination with accompanying drawings, technical solutions and other advantageous effects of the present disclosure will be apparent from the detailed description of the implementations of the present disclosure.

DETAILED DESCRIPTION

Referring to accompanying drawings, same components are identified by same reference numerals. Principles of the present disclosure are exemplified in connection with a suitable computing environment. The following description is based on the detailed description of the present disclosure as examples, and should not be taken as limiting other specific implementations that are not described herein.

In the following description, the detailed description of the present disclosure will be described with reference to steps and symbols executed by one or more computers, unless otherwise stated. Thus, execution of these steps and operations by a computer will be referred to several times. The computer execution referred to herein includes executing an operation of a computer processing unit that represents electronic signals of data in a structured form. This operation involves converting the data or maintaining the data at a location of the computer's memory system. The operation can be reconfigured, or the operation of the computer can be altered in a manner well-known to those skilled in the art. Data structure maintained by the data is a physical location of the memory, and has specific characteristics defined by format of the data. However, the principles of the present disclosure are described in the above text, which is not intended to be a limitation. Those skilled in the art will appreciate that various steps and operations described below can also be implemented in hardware.

The principles of the present disclosure are implemented by using many other general purpose or special purpose computing, communication environments, or configurations. Examples of well-known computing systems, environments, and configurations suitable for the present disclosure may include, but are not limited to, hand-held phones, personal computers, servers, multi-processor systems, microcomputer-based systems, mainframe computers, and a distributed computing environment including any of the above systems or devices.

The following are described in detail.

According to implementations of the present disclosure, a method for controlling a frame rate of an electronic device is provided. The method includes the following. A frame rate of rendering and a priority of each of target objects currently running on the electronic device are obtained. A synthesizing frame rate of the electronic device is determined according to the frame rate of rendering and the priority of each of the target objects. According to the synthesizing frame rate, respective images rendered by the target objects are synthesized to generate a to-be-displayed image.

In some implementations, the frame rate of rendering of each of the target objects currently running on the electronic device is obtained as follows. In a current running scenario, the frame rate of rendering of each of the target objects of the electronic device is obtained from a list, where the list contains a correspondence between running scenarios and frame rates of rendering of the target objects.

In some implementations, the frame rate of rendering of each of the target objects currently running on the electronic device is obtained as follows. In a current running scenario, a real-time frame rate of rendering of each of the target objects currently running on the electronic device is obtained.

In some implementations, the synthesizing frame rate of the electronic device is determined according to the frame rate of rendering and the priority of each of the target objects as follows. According to the frame rate of rendering and the priority of each of the target objects, a frame rate of rendering of a target object with a highest priority is determined as the synthesizing frame rate of the electronic device.

In some implementations, the synthesizing frame rate of the electronic device is determined according to the frame rate of rendering and the priority of each of the target objects as follows. A weight of each of the target objects is determined according to the priority of each of the target objects. A sum of products is determined as the synthesizing frame rate of the electronic device, where each of the products is obtained by multiplying the frame rate of rendering of each of the target objects by the weight of each of the target objects, and the sum is smaller than a maximum refresh rate of a display screen of the electronic device.

In some implementations, the method further includes the following. A priority update instruction input in response to a user operation is received. The priority of each of the target objects is updated according to the priority update instruction.

According to implementations of the present disclosure, an electronic device is provided. The electronic device includes at least one processor and a computer readable storage. The computer readable storage is coupled to the at least one processor and stores at least one computer executable instruction thereon which, when executed by the at least one processor, causes the at least one processor to: obtain a frame rate of rendering and a priority of each of target objects currently running on the electronic device; determine a synthesizing frame rate of the electronic device according to the frame rate of rendering and the priority of each of the target objects; and synthesize, according to the synthesizing frame rate, respective images rendered by the target objects to generate a to-be-displayed image.

According to implementations of the present disclosure, a non-transitory computer readable storage medium is provided. The non-transitory computer readable storage medium is configured to store a computer program which, when executed by a processor, causes the processor to carry out following actions. A frame rate of rendering and a weight of each of target objects currently running on an electronic device are obtained, where the weight of each of the target objects is determined according to a priority of each of the target objects. A sum of products is compared with a maximum refresh rate of a display screen of the electronic device, where each of the products is obtained by multiplying the frame rate of rendering of each of the target objects by a corresponding weight. A synthesizing frame rate of the electronic device is determined according to a comparison result between the sum of the products and the maximum refresh rate. According to the synthesizing frame rate, respective images rendered by the target objects are synthesized to generate a to-be-displayed image.

Implementations of the present disclosure will be detailed below with reference to the accompanying drawings.

In some implementations, the method further includes the following. A refresh rate of a display screen of the electronic device is set to be the same as the synthesizing frame rate.

Figure 1:
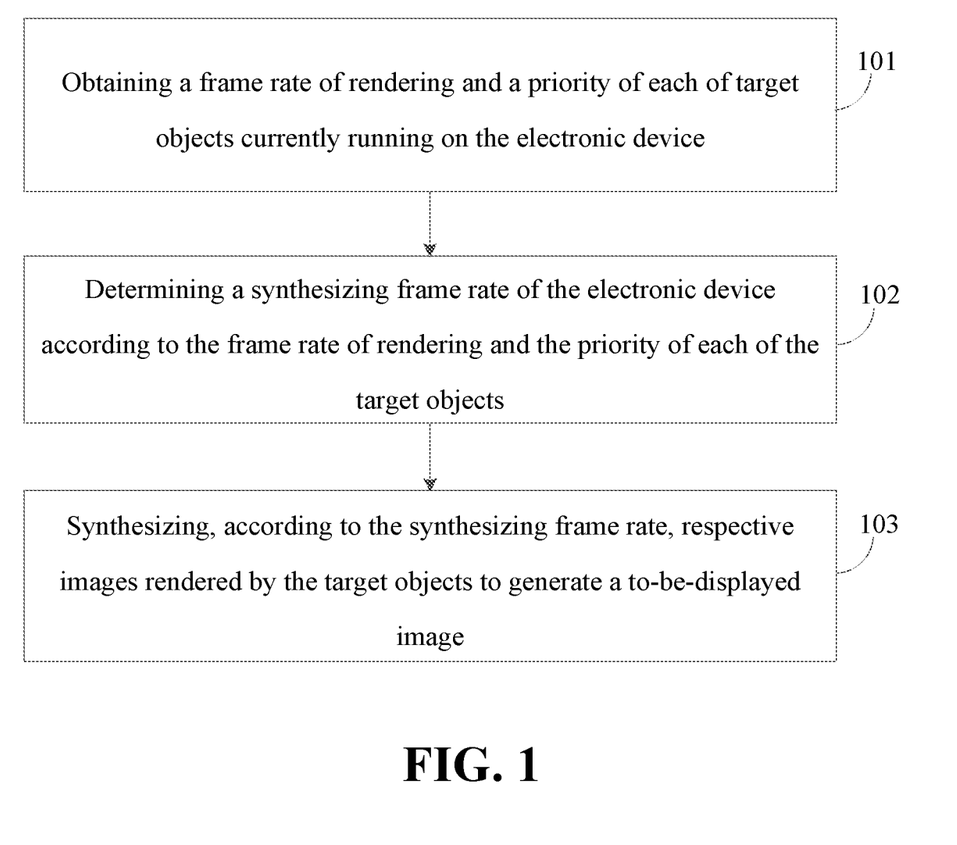
FIG. 1 is a schematic flow chart illustrating a method for controlling a frame rate of an electronic device according to an implementation of the present disclosure.

FIG. 1 is a schematic flow chart illustrating a method for controlling a frame rate of an electronic device according to an implementation of the present disclosure. The method of this implementation may be executed by a device for controlling a frame rate of an electronic device. The device may be implemented with hardware and/or software. The device, as part of the electronic device, may be disposed in the electronic device.

As illustrated in FIG. 1, the method for controlling a frame rate of an electronic device according to the implementation includes the following.

At block 101, a frame rate of rendering and a set priority of each of target objects currently running on the electronic device are obtained, where each of the target objects includes an application or a window.

The frame rate of rendering of each of the target objects may be obtained as follows. In a current running scenario, a real-time frame rate of rendering of each of the target objects is obtained, or in the current running scenario, the frame rate of rendering of each of the target objects is obtained from a set white list, where the set white list contains a correspondence between running scenarios and frame rates of rendering of the target objects.

Various running scenarios may be involved in an operation of the electronic device. Example 1, one application is currently running, such as a video is played in a full-screen mode. Example 2, multiple applications are currently running at the same time, for example, contents of a browser application and contents of an anti-virus application are displayed simultaneously, where the contents of the antivirus application is displayed in a form of a buoy. Example 3, one or more windows are currently running, where one or more applications may be displayed in each window. In the set white list, the frame rate of rendering of each target object can be set according to a running scenario.

Running scenarios of the electronic device may be distinguished according to process identifiers of running applications. Also, the running scenarios of the electronic device may be identified and distinguished according to the process identifiers and touch data. For example, the touch data may contain a touch position, a touch area, and duration of touch, and the like. In an implementation, statistics and analysis can be performed on the touch data, a touch event is determined according to a statistical analysis result, and a running scenario of the electronic device is identified according to the process identifiers and the touch event. For example, the touch event may include no event (e.g., no touch on a touch screen is detected within a preset time period), a click event, a leaving event (e.g., from touch to release), a slow sliding event, a fast sliding event, and the like.

The method further includes operations of setting a priority of each of the target objects. A priority of an application can be set according to properties of the application, or a priority of a window can be set according to properties of the window. As an example, video-type applications are set to have a highest priority, social-type applications are set to have an intermediate priority, and reader-type applications are set to have a lowest priority. As another example, active windows are set to have a high priority, and inactive windows are set to have a low priority. It can be understood that there may be two priority levels, three priority levels, or other.

At block 102, a synthesizing frame rate of the electronic device is determined according to the frame rate of rendering and the set priority of each of the target objects.

Figure 2:
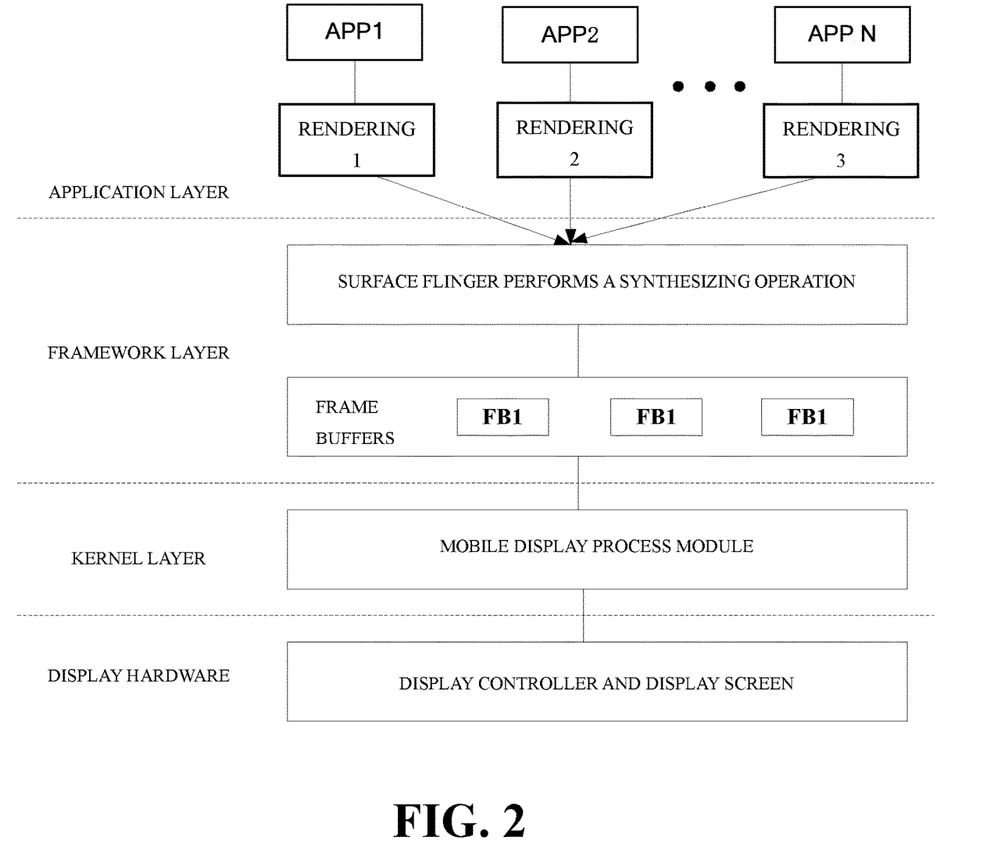
FIG. 2 is a schematic diagram illustrating a display process according to an implementation of the present disclosure.

In order to facilitate understanding, an Android® system is taken as an example to briefly describe a process from generation of a to-be-displayed image to display of the to-be-displayed image in the Android® system. FIG. 2 is a schematic diagram illustrating a display process according to an implementation of the present disclosure.

First, in an application layer, each application (hereinafter, "APP" for short) performs an image drawing operation separately according to application design conditions of each application (generally, determined by a corresponding Android® package (APK)). After the drawing operation, each application sends one or more images rendered by each application to a synthesizing module (e.g., surface flinger) that performs an image synthesizing operation.

Then, in a framework layer, the Android® system has three frame buffers (FB), and the three FBs can be used cyclically. The surface flinger finds an unoccupied FB from the three FBs. In the unoccupied FB, according to application configuration information, for example, which image should be bottomed, which image should be topped, a transparency effect is applied to which image, etc., by means of a synthesizing operation, multiple images respectively rendered by applications are superimposed to obtain a final display frame (i.e., a to-be-displayed image) for display.

Finally, in a kernel layer, the to-be-displayed image is transmitted to a display hardware via a mobile display process (MDP) module, where the display hardware includes a display controller and the display screen, so that the to-be-displayed image is finally displayed on the display screen. The type of the display screen is not limited herein. For example, the display screen is a liquid crystal display (LCD).

Figure 3:
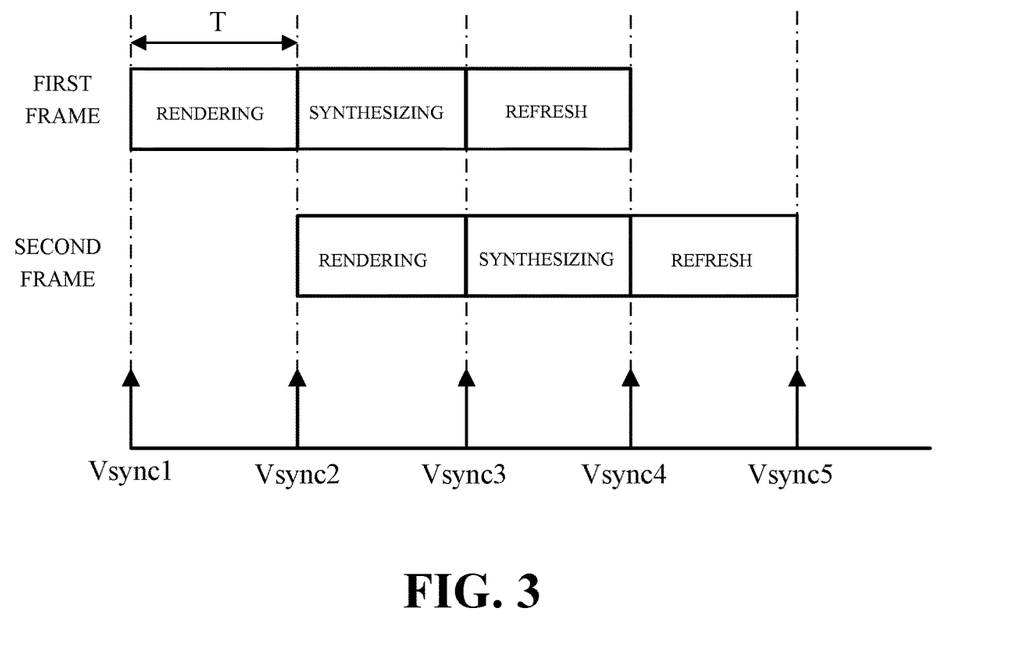
FIG. 3 is a schematic diagram illustrating a vertical synchronization (Vsync) display refresh mechanism according to an implementation of the present disclosure.

In addition, during a display refresh process, for the Android® system, a Vsync refresh mechanism is introduced. FIG. 3 is a schematic diagram illustrating a Vsync display refresh mechanism according to an implementation of the present disclosure. The Vsync refresh mechanism essentially refers to inserting a "heartbeat" (i.e., a system Vsync signal) throughout a display flow, and the system Vsync signal is sent by the display controller to a central processing unit (CPU) to generate a Vsync interrupt, so that each drawing operation and each synthesizing operation need to be completed according to the heartbeat, thereby incorporating key operations of the whole display process into a unified management mechanism of the Vsync. Currently, the frequency of the Vsync signal is usually 60 Hz.

As illustrated in FIG. 3, assuming that the cycle of the Vsync signal is T, regardless of transmission delay of the Vsync signal, after a first Vsync signal Vsync1 reaches the CPU, the CPU controls the surface flinger to forward the first Vsync signal Vsync1 to each application, and each application starts to perform a drawing operation in response to a user operation such as a touch slide operation on the display screen. Multiple images rendered by each application are obtained after the drawing operation. After a second Vsync signal Vsync2 reaches the CPU, the CPU controls the display controller to forward the second Vsync signal Vsync2 to the surface flinger. The surface flinger starts to perform an image synthesizing operation, and synthesizes the multiple images rendered by respective applications to generate (or compose) a to-be-displayed image. After a third Vsync signal Vsync3 reaches the CPU, the Android® system starts to perform a display refresh operation and finally displays the to-be-displayed image on the display screen.

In an image rendering process, an image synthesizing process, and an image refresh display process of the electronic device, three kinds of frame rates are involved, which are a frame rate of rendering, a synthesizing frame rate, and a refresh rate, respectively.

The frame rate of rendering is used for triggering the surface flinger to perform the synthesizing operation after each application finishes the image drawing operation. The frame rate of rendering can also be understood as the number of times that each application performs the image drawing operation per unit time (e.g., one second).

The synthesizing frame rate is used for synthesizing images rendered by respective applications to a to-be-displayed image.

The refresh rate refers to a frame rate according to which an image displayed on the display screen of the electronic device is refreshed.

In the present disclosure, the method for controlling a frame rate mainly relates to the image drawing operation in the display process of the to-be-displayed image mentioned above. The drawing operation may be performed in software, hardware, or other manners. Performing in software usually refers to that the drawing operation is implemented with an algorithm embedded in the CPU of the electronic device. Performing in hardware usually refers to that the drawing operation is implemented with a dedicated chip of a graphic processing unit (GPU) or a mobile display process (MDP) module of the electronic device.

In the implementation, the method for controlling a frame rate mainly relates to the image drawing operation and an image synthesizing operation in the display process of the to-be-displayed image mentioned above. The drawing operation and the synthesizing operation may be performed in software, hardware, or other manners. Performing in software usually refers to that the drawing operation is implemented with an algorithm embedded in the CPU of the electronic device. Performing in hardware usually refers to that the drawing operation is implemented with a dedicated chip embedded in the GPU or the MDP module of the electronic device.

According to the method provided in this implementation, when determining the synthesizing frame rate of the electronic device, the frame rate of rendering and the set priority of each of the target objects currently running are fully considered. For example, a sum of products is determined as the synthesizing frame rate of the electronic device, where each of the products is obtained by multiplying the frame rate of rendering of each of the target objects by a weight of each of the target objects. For another example, a frame rate of rendering of a target object with a highest priority is determined as the synthesizing frame rate of the electronic device.

The operation at block 102 may be implemented as follows. For example, the sum of the products is determined as the synthesizing frame rate of the electronic device, where each of the products is obtained by multiplying the frame rate of rendering of each of the target objects by the weight of each of the target objects, and the sum is smaller than a maximum refresh rate of a display screen of the electronic device. For another example, according to the frame rate of rendering and the set priority of each of the target objects, the frame rate of rendering of the target object with the highest priority is determined as the synthesizing frame rate of the electronic device.

The following describes a relationship between frame rates of rendering and the synthesizing frame rate. The synthesizing frame rate C ranges from Pmax to min(Psum, a refresh rate), where Pmax is the largest frame rate of rendering among frame rates of rendering of all applications, and Psum is a sum of the frame rates of rendering of all applications. For example, if there are three running applications, a maximum refresh rate of a display screen is 60 Hz. Frame rates of rendering of the three applications are 20 Hz, 30 Hz, and 40 Hz, respectively. Since in response to the same Vsync signal, one, two, or three applications may perform the drawing operation, different drawing operations of each application per unit time may be performed in response to a same Vsync signal or different Vsync signals, and so the synthesizing frame rate C is [40, 60].

The reason why the frame rate of rendering of the target object with the highest priority is determined as the synthesizing frame rate is that a user usually pays attention to the target object with the highest priority, and if the frame rate of rendering of the target object with the highest priority is set to be the synthesizing frame rate, operations for synthesizing rendering images of other lower priority applications can be simplified while ensuring that images rendered by the application with the highest priority can be synthesized, and so power consumption of the CPU or the GPU of the electronic device for performing synthesizing operations can be reduced. Similar to the above example, if the frame rate of rendering of the application with the highest priority is 40, the synthesizing frame rate in actual synthesizing process ranges from 40 to 60. By setting the synthesizing frame rate to be 40, the frequency of the synthesizing operation can be reduced, and so the power consumption can be reduced.

At block 103, according to the synthesizing frame rate, respective images rendered by the target objects are synthesized to generate a to-be-displayed image.

According to the synthesizing frame rate, respective images rendered by the target objects are synthesized to compose (or generate) the to-be-displayed image for display.

The method further includes the following. A priority update instruction input in response to a user operation is received. The set priority of each of the target objects is updated according to the priority update instruction.

The method further includes the following. A refresh rate of the display screen of the electronic device is set to be the same as the synthesizing frame rate. Compared with the display screen having a fixed refresh rate, i.e., 60 Hz, by setting the refresh rate of the display screen to be the same as the synthesizing frame rate, power consumption of the display screen of the electronic device can be reduced.

According to the method for controlling a frame rate of an electronic device provided by the implementation, by obtaining the frame rate of rendering and the set priority of each of target objects currently running on the electronic device, where each of the target objects includes an application or a window, by determining the synthesizing frame rate of the electronic device according to the frame rate of rendering and the set priority of each of the target objects, according to the synthesizing frame rate, respective images rendered by the target objects can be synthesized to generate a to-be-displayed image, which can reasonably control the synthesizing frame rate of the electronic device.

Figure 4:
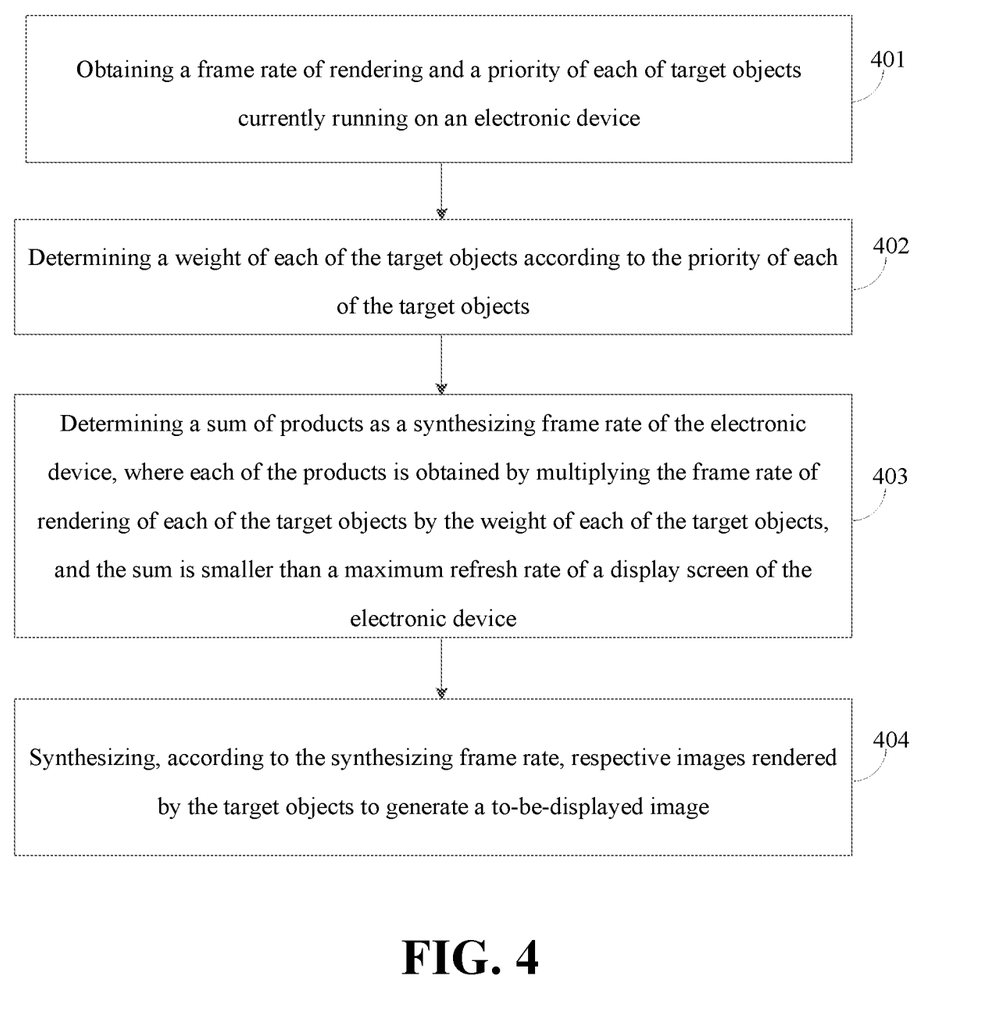
FIG. 4 is a schematic flow chart illustrating a method for controlling a frame rate of an electronic device according to an implementation of the present disclosure.

FIG. 4 is a schematic flow chart illustrating a method for controlling a frame rate of an electronic device according to an implementation of the present disclosure. As illustrated in FIG. 4, the method in this implementation includes the following.

At block 401, a frame rate of rendering and a set priority of each of target objects currently running on the electronic device are obtained, where each of the target objects includes an application or a window.

At block 402, a weight of each of the target objects is determined according to the set priority of each of the target objects.

The higher a set priority, the larger a weight corresponding to the set priority. A sum of respective weights of the target objects is 1. For example, among three applications currently running, a priority of an application (hereinafter, "APP" for short) 1 is level 1, a priority of an APP 2 is level 2, and a priority of an APP 3 is level 3, then respective weights of the three applications can be determined to be 0.5, 0.3, and 0.2, respectively.

At block 403, a sum of products is determined as a synthesizing frame rate of the electronic device, where each of the products is obtained by multiplying the frame rate of rendering of each of the target objects by the weight of each of the target objects, and the sum is smaller than a maximum refresh rate of a display screen of the electronic device.

Similar to the above example, the sum X of (0.5*P1+0.3*P2+0.2*P3) can be determined as the synthesizing frame rate, where X is smaller than the maximum refresh rate of the display screen. If X is greater than the maximum refresh rate of the display screen, the synthesizing frame rate is set to be the maximum refresh rate of the display. P1 represents a frame rate of rendering of the APP 1, P2 represents a frame rate of rendering of the APP 2, and P3 represents a frame rate of rendering of the APP 3.

The above settings have the following advantages. Compared with that the synthesizing frame rate is determined based on only the frame rate of rendering of each application, the synthesizing frame rate is determined according to a priority of each application currently running, such that the synthesizing frame rate can be controlled to well adapt the synthesizing frame rate to an application or a window with a high priority in a currently running scenario.

At block 404, according to the synthesizing frame rate, respective images rendered by the target objects are synthesized to generate a to-be-displayed image.

According to the synthesizing frame rate, respective images rendered by the target objects are synthesized to compose (or generate) the to-be-displayed image for display.

According to the method provided by the implementation, by obtaining the frame rate of rendering and the set priority of each of the target objects currently running on the electronic device, where the target object includes an application or a window, by determining the weight of each of the target objects according to the set priority of each of the target objects, and by determining the sum of the products as the synthesizing frame rate of the electronic device, where each of the products is obtained by multiplying the frame rate of rendering of each of the target objects by the weight of each of the target objects, according to the synthesizing frame rate, respective images rendered by the target objects can be synthesized to generate a to-be-displayed image, so that the synthesizing frame rate of the electronic device can be reasonably controlled.

A device for controlling a frame rate of an electronic device is provided. The device includes a rendering-frame-rate obtaining module, a synthesizing-frame-rate determining module, and a to-be-displayed image composing module. The rendering-frame-rate obtaining module is configured to obtain a frame rate of rendering and a set priority of each of target objects currently running on the electronic device, where each of the target objects includes an application or a window. The synthesizing-frame-rate determining module is configured to determine a synthesizing frame rate of the electronic device according to the frame rate of rendering and the set priority of each of the target objects. The to-be-displayed image composing module is configured to synthesize, according to the synthesizing frame rate, respective images rendered by the target objects to generate a to-be-displayed image.

In some implementations, the rendering-frame-rate obtaining module is configured to obtain, in a current running scenario, the frame rate of rendering of each of the target objects of the electronic device from a set white list, where the set white list contains a correspondence between running scenarios and frame rates of rendering of the target objects.

In some implementations, the rendering-frame-rate obtaining module is configured to obtain, in a current running scenario, a real-time frame rate of rendering of each of the target objects currently running on the electronic device.

In some implementations, the synthesizing-frame-rate determining module is configured to determine a frame rate of rendering of a target object with a highest priority as the synthesizing frame rate of the electronic device according to the frame rate of rendering and the set priority of each of the target objects.

In some implementations, the synthesizing-frame-rate determining module is configured to: determine a weight of each of the target objects according to the set priority of each of the target objects; and determine a sum of products as the synthesizing frame rate of the electronic device, where each of the products is obtained by multiplying the frame rate of rendering of each of the target objects by the weight of each of the target objects, and the sum is smaller than a maximum refresh rate of a display screen of the electronic device.

In some implementations, the device further includes a priority-updating module. The priority-updating module is configured to receive a priority update instruction input in response to a user operation, and to update the set priority of each of the target objects according to the priority update instruction.

In some implementations, the device further includes a refresh-rate setting module. The refresh-rate setting module is configured to set a refresh rate of a display screen of the electronic device to be the same as the synthesizing frame rate.

Figure 5:
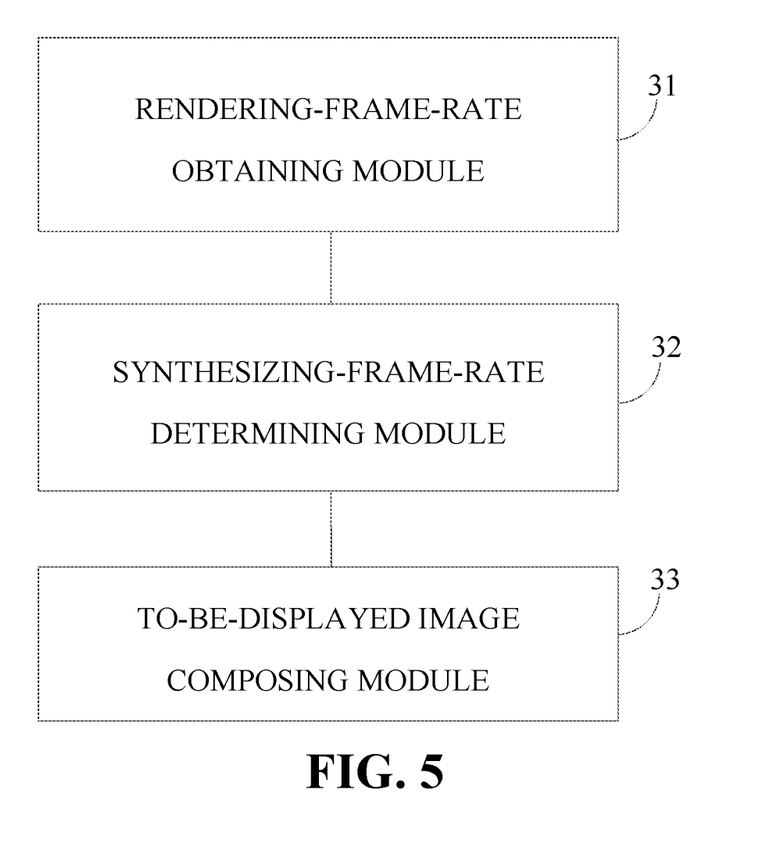
FIG. 5 is a schematic structural diagram illustrating a device for controlling a frame rate of an electronic device according to an implementation of the present disclosure.

FIG. 5 is a schematic structural diagram illustrating a device for controlling a frame rate of an electronic device according to an implementation of the present disclosure. The device can be implemented with software and/or hardware and integrated in the electronic device. As illustrated in FIG. 5, the device includes a rendering-frame-rate obtaining module 31, a synthesizing-frame-rate determining module 32, and a to-be-displayed image composing module 33.

The rendering-frame-rate obtaining module 31 is configured to obtain a frame rate of rendering and a set priority of each of target objects currently running on the electronic device, where each of the target objects includes an application or a window.

The synthesizing-frame-rate determining module 32 is configured to determine a synthesizing frame rate of the electronic device according to the frame rate of rendering and the set priority of each of the target objects.

The to-be-displayed image composing module 33 is configured to synthesize, according to the synthesizing frame rate, respective images rendered by the target objects to generate a to-be-displayed image.

The rendering-frame-rate obtaining module 31 is configured to obtain, in a current running scenario, the frame rate of rendering of each of the target objects of the electronic device from a set white list, where the set white list contains a correspondence between running scenarios and frame rates of rendering of the target objects.

The rendering-frame-rate obtaining module 31 is configured to obtain, in a current running scenario, a real-time frame rate of rendering of each of the target objects currently running on the electronic device.

The synthesizing-frame-rate determining module 32 is configured to determine a frame rate of rendering of a target object with a highest priority as the synthesizing frame rate of the electronic device according to the frame rate of rendering and the set priority of each of the target objects.

The synthesizing-frame-rate determining module 32 is configured to determine a weight of each of the target objects according to the set priority of each of the target objects, and to determine a sum of products as the synthesizing frame rate of the electronic device, where each of the products is obtained by multiplying the frame rate of rendering of each of the target objects by the weight of each of the target objects, and the sum is smaller than a maximum refresh rate of a display screen of the electronic device.

The device further includes a priority-updating module. The priority-updating module is configured to receive a priority update instruction input in response to a user operation, and to update the set priority of each of the target objects according to the priority update instruction.

The device further includes a refresh-rate setting module. The refresh-rate setting module is configured to set a refresh rate of a display screen of the electronic device to be the same as the synthesizing frame rate.

According to the device provided in this implementation, by obtaining the frame rate of rendering and the set priority of each of target objects currently running on the electronic device, where each of the target objects includes an application or a window, by determining the synthesizing frame rate of the electronic device according to the frame rate of rendering and the set priority of each of the target objects, according to the synthesizing frame rate, respective images rendered by the target objects can be synthesized to generate a to-be-displayed image, which can reasonably control the synthesizing frame rate of the electronic device.

An electronic device is provided. The electronic device includes a memory, a processor, and computer programs stored in the memory and configured to be executed by the processor. The computer programs, when executed by the processor, are operable with the processor to: obtain a frame rate of rendering and a set priority of each of target objects currently running on the electronic device, where each of the target objects includes an application or a window; determine a synthesizing frame rate of the electronic device according to the frame rate of rendering and the set priority of each of the target objects; and synthesize, according to the synthesizing frame rate, respective images rendered by the target objects to generate a to-be-displayed image.

In some implementations, the processor configured to obtain the frame rate of rendering of each of the target objects currently running on the electronic device is configured to: obtain, in a current running scenario, the frame rate of rendering of each of the target objects of the electronic device from a set white list, where the set white list contains a correspondence between running scenarios and frame rates of rendering of the target objects.

In some implementations, the processor configured to obtain the frame rate of rendering of each of the target objects currently running on the electronic device is configured to obtain, in a current running scenario, a real-time frame rate of rendering of each of the target objects currently running on the electronic device.

In some implementations, the processor configured to determine the synthesizing frame rate of the electronic device according to the frame rate of rendering and the set priority of each of the target objects is configured to: determine a frame rate of rendering of a target object with a highest priority as the synthesizing frame rate of the electronic device according to the frame rate of rendering and the set priority of each of the target objects.

In some implementations, the processor configured to determine the synthesizing frame rate of the electronic device according to the frame rate of rendering and the set priority of each of the target objects is configured to: determine a weight of each of the target objects according to the set priority of each of the target objects; and determine a sum of products as the synthesizing frame rate of the electronic device, where each of the products is obtained by multiplying the frame rate of rendering of each of the target objects by the weight of each of the target objects, and the sum is smaller than a maximum refresh rate of a display screen of the electronic device.

In some implementations, the processor is further configured to: receive a priority update instruction input in response to a user operation; and update the set priority of each of the target objects according to the priority update instruction.

In some implementations, the processor is further configured to set a refresh rate of a display screen of the electronic device to be the same as the synthesizing frame rate.

Figure 6:
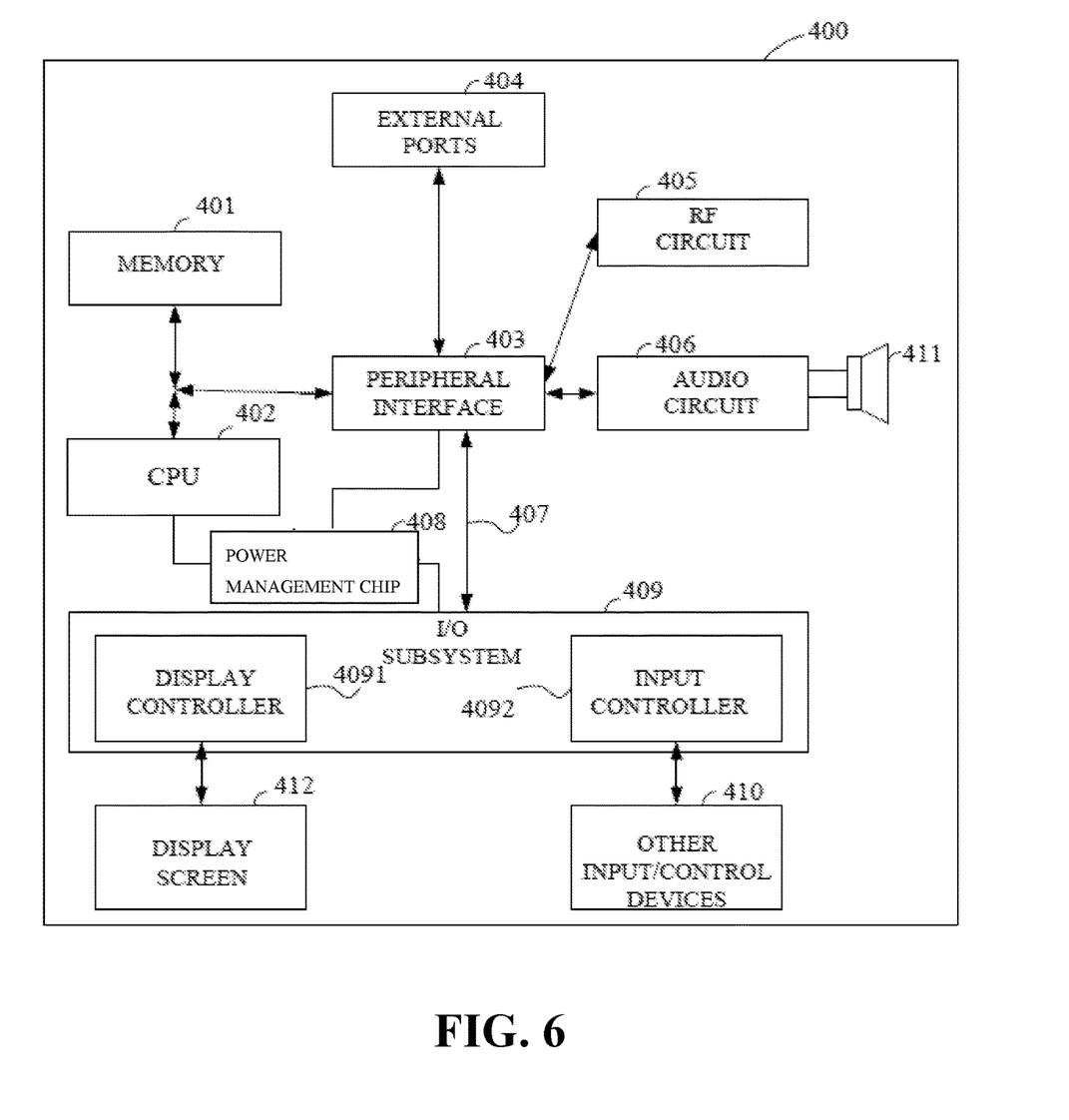
FIG. 6 is a schematic structural diagram illustrating an electronic device according to an implementation of the present disclosure.

FIG. 6 is a schematic structural diagram illustrating an electronic device according to an implementation of the present disclosure. The electronic device may include a device for controlling a frame rate of an electronic device according to any implementation of the present disclosure. As illustrated in FIG. 6, the electronic device includes a memory 401 and a central processing unit 402 (also referred to as a processor, hereinafter, referred to as a CPU). The memory 401 is configured to store executable program codes. The processor 402 is configured to run programs corresponding to the executable program codes by reading the executable program codes stored in the memory 401 to carry out the following operations. A frame rate of rendering and a set priority of each of target objects currently running on the electronic device are obtained, where each of the target objects includes an application or a window. A synthesizing frame rate of the electronic device is determined according to the frame rate of rendering and the set priority of each of the target objects. According to the synthesizing frame rate, respective images rendered by the target objects are synthesized to generate a to-be-displayed image.

The electronic device further includes a peripheral interface 403, a radio frequency (RF) circuit 405, an audio circuit 406, a speaker 411, a power management chip 408, an input/output (I/O) subsystem 409, a touch screen (i.e., a display screen) 412, other input/control devices 410, and external ports 404. These components communicate with each other via one or more communication buses or signal lines 407.

It should be understood that the electronic device 400 illustrated is merely one example of an electronic device, and the electronic device 400 may have more or fewer components than those illustrated in the figures. For example, two or more components may be combined, or different component configurations can be adopted in the electronic device. The various components illustrated in the figures can be implemented in hardware, software, or a combination of hardware and software including one or more signal processing and/or application specific integrated circuits.

The following describes an electronic device for controlling a frame rate, which takes a mobile phone as an example.

The memory 401 can be accessed by the CPU 402, the peripheral interface 403, and so on. The memory 401 may include a high-speed random access memory and may further include a non-transitory memory such as one or more magnetic disk storage devices, flash memory devices, or other volatile solid-state storage devices.

The peripheral interface 403 is configured to connect input and output peripherals of the device to the CPU 402 and the memory 401.

The I/O subsystem 409 can be configured to connect the input and output peripherals on the device, such as the touch screen 412 and other input/control devices 410, to the peripheral interface 403. The I/O subsystem 409 may include a display controller 4091 and one or more input controllers 4092 configured to control other input/control devices 410. One or more input controllers 4092 are configured to receive electrical signals from or send electrical signals to other input/control devices 410, where other input/control devices 410 may include a physical button (a press button, a rocker button, etc.), a dial, a slide switch, a joystick, or a click wheel. It should be noted that the input controller 4092 can be coupled with any of a keyboard, an infrared port, a USB interface, and a pointing device such as a mouse.

The touch screen 412 is an input interface and an output interface between the mobile phone and a user, and is configured to display a visual output to the user. The visual output may include graphics, text, icons, videos, and the like.

The display controller 4091 in the I/O subsystem 409 is configured to receive electrical signals from or send electrical signals to the touch screen 412. The touch screen 412 is configured to detect contact on the touch screen, and the display controller 4091 is configured to convert the contact detected into an interaction with a user interface object displayed on the touch screen 412, that is, to realize human-computer interaction. The user interface object displayed on the touch screen 412 may be an icon of a running game, an icon indicating connection to corresponding networks, and the like. It should be noted that the device may also include a light mouse, which is a touch sensitive surface that does not display a visual output, or an extension of a touch sensitive surface formed by the touch screen.

The RF circuit 405 is mainly configured to establish communication between the mobile phone and the wireless network (i.e., network side) and to transmit and receive data between the mobile phone and the wireless network, for example, transmit and receive short messages, emails, and the like. The RF circuit 405 is configured to receive and transmit RF signals (which is also referred to as electromagnetic signals), to convert an electrical signal into an electromagnetic signal or convert an electromagnetic signal into an electrical signal, and to communicate with a communication network and other devices through the electromagnetic signals. The RF circuitry 405 may include known circuits for performing these functions, including but not limited to an antenna system, an RF transceiver, one or more amplifiers, a tuner, one or more oscillators, a digital signal processor, a coder-decoder (codec) chipset, a subscriber identity module (SIM), and so on.

The audio circuit 406 is mainly configured to receive audio data from the peripheral interface 403, to convert the audio data into an electrical signal, and to transmit the electrical signal to the speaker 411.

The speaker 411 is configured to restore the voice signal received by the mobile phone from the wireless network via the RF circuit 405 to sound and to play the sound to the user.

The power management chip 408 is configured for power supply and power management of the hardware connected to the CPU 402, the I/O subsystem 409, and the peripheral interface 403.

The foregoing electronic device may execute methods provided by any of the implementations of the present disclosure, and has function modules for executing the methods. By obtaining the frame rate of rendering and the set priority of each of target objects currently running on the electronic device, where each of the target objects includes an application or a window, by determining the synthesizing frame rate of the electronic device according to the drawing frame rate and the setting priority of each target object, according to the synthesizing frame rate, respective images rendered by the target objects can be synthesized to generate a to-be-displayed image, which can reasonably control the synthesizing frame rate of the electronic device.

Figure 7:
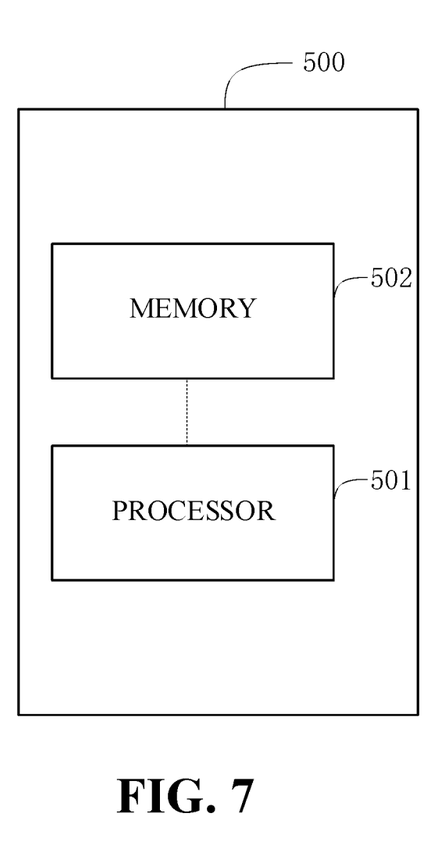
FIG. 7 is a schematic structural diagram illustrating an electronic device according to another implementation of the present disclosure.
Figure 8:
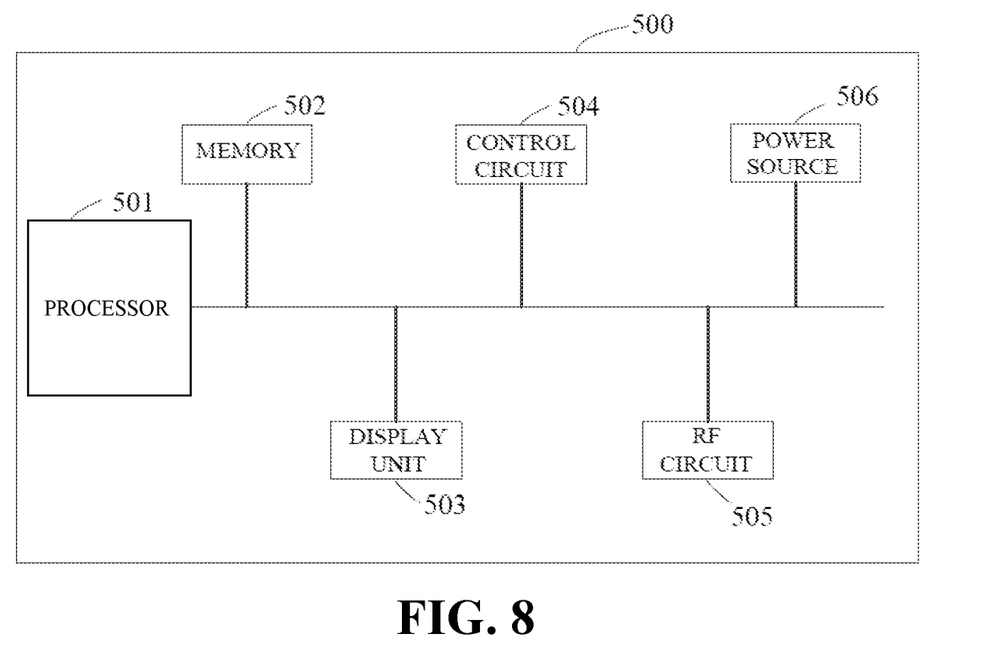
FIG. 8 is a schematic structural diagram illustrating an electronic device according to yet another implementation of the present disclosure.

FIG. 7 is a schematic structural diagram illustrating an electronic device according to another implementation of the present disclosure. FIG. 8 is a schematic structural diagram illustrating an electronic device according to yet another implementation of the present disclosure. As illustrated in FIG. 7 and FIG. 8, an electronic device 500 includes a processor 501, a memory 502, a display unit 503, and a control circuit 504. Those skilled in the art can understand that the structure of the electronic device 500 illustrated in FIG. 5 does not constitute a limitation on the electronic device 500. The electronic device 500 configured to implement technical solutions of the disclosure may include more or fewer components than illustrated, or may combine certain components, or may have different components configurations. It should be noted that the electronic device 500 may include an electronic device with a screen display such as a smart phone, a tablet computer, a notebook computer, and a desktop computer.

The processor 501 is a control center of the electronic device 500. The processor 501 is configured to connect various parts of the entire electronic device 500 through various interfaces and lines, and to execute various functions of the electronic device 500 and process data by running or executing programs stored in the memory 502 and calling data stored in the memory 502, thereby monitoring the electronic device 500.

The processor 501 is configured to load an executable file corresponding to one or more program processes into the memory 502 according to following instructions, and to run programs stored in the memory 502, thereby implementing various functions, including: obtaining a frame rate of rendering and a set priority of each of target objects currently running on the electronic device, where each of the target objects includes an application or a window; determining a synthesizing frame rate of the electronic device according to the frame rate of rendering and the set priority of each of the target objects; and synthesizing, according to the synthesizing frame rate, respective images rendered by the target objects currently running to generate a to-be-displayed image for display.

In some implementations, the processor 501 is further configured to obtain, in a current running scenario, the frame rate of rendering of each of the target objects of the electronic device from a set white list, where the set white list contains a correspondence between running scenarios and frame rates of rendering of the target objects.

In some implementations, the processor 501 is further configured to obtain, in a current running scenario, a real-time frame rate of rendering of each of the target objects currently running on the electronic device.

In some implementations, the processor 501 is further configured to determine a frame rate of rendering of a target object with a highest priority as the synthesizing frame rate of the electronic device according to the frame rate of rendering and the set priority of each of the target objects.

In some implementations, the processor 501 configured to determine the synthesizing frame rate of the electronic device according to the frame rate of rendering and the set priority of each of the target objects is configured to: determine a weight of each of the target objects according to the set priority of each of the target objects; and determine a sum of products as the synthesizing frame rate of the electronic device, where each of the products is obtained by multiplying the frame rate of rendering of each of the target objects by the weight of each of the target objects, and the sum is smaller than a maximum refresh rate of a display screen of the electronic device.

In some implementations, the processor 501 is further configured to: receive a priority update instruction input in response to a user operation, and update the set priority of each of the target objects according to the priority update instruction.

In some implementations, the processor 501 is further configured to set a refresh rate of a display screen of the electronic device to be the same as the synthesizing frame rate.

The display screen 503 can be configured to display information input by the user to the electronic device 500 or information provided to the user and various graphical user interfaces of the electronic device 500. These graphical user interfaces may be composed of graphics, text, icons, video, and any combination thereof.

The control circuit 504 is electrically coupled with the display screen 503, and is configured to control a state of the display screen 503 under the scheduling of the processor 501.

The electronic device 500 may further include a radio frequency circuit 505. The radio frequency circuit 505 is configured to send and receive radio frequency signals, such as receiving data packets sent from multiple servers that establish communication links with the radio frequency circuit 505.

In some implementations, the electronic device 500 further includes a power source 506. The power source 506 is configured to supply power to various components of electronic device 500. For instance, the power source 506 can be logically coupled to the processor 501 through a power management system to manage functions such as charging, discharging, and power management through the power management system.

Although not illustrated in FIG. 7 and FIG. 8, the electronic device 500 may further include a camera, a Bluetooth module, and the like, and the disclosure will not elaborate herein.

A non-transitory computer readable storage medium is provided. The non-transitory computer readable storage medium is configured to store a computer program which, when executed by a processor, causes the processor to carry out following actions. A frame rate of rendering and a weight of each of target objects currently running on an electronic device are obtained, where the weight of each of the target objects is determined according to a priority of each of the target objects. A sum of products is compared with a maximum refresh rate of a display screen of the electronic device, where each of the products is obtained by multiplying the frame rate of rendering of each of the target objects by a corresponding weight. A synthesizing frame rate of the electronic device is determined according to a comparison result between the sum of the products and the maximum refresh rate. According to the synthesizing frame rate, respective images rendered by the target objects are synthesized to generate a to-be-displayed image.

In some implementations, for obtaining the frame rate of rendering of each of the target objects currently running on the electronic device, the computer program is executed by the processor to carry out following actions. In a current running scenario, the frame rate of rendering of each of the target objects of the electronic device is obtained from a set white list, where the set white list contains a correspondence between running scenarios and frame rates of rendering of the target objects.

In some implementations, for obtaining the frame rate of rendering of each of the target objects currently running on the electronic device, the computer program is executed by the processor to carry out following actions. In a current running scenario, a real-time frame rate of rendering of each of the target objects currently running on the electronic device is obtained.

In some implementations, if the sum of the products is smaller than the maximum refresh rate of the display screen of the electronic device, for determining the synthesizing frame rate of the electronic device according to the determining result, the computer program is executed by the processor to carry out following actions. A frame rate of rendering of a target object with a highest priority is determined as the synthesizing frame rate of the electronic device.

In some implementations, if the sum of the products is smaller than the maximum refresh rate of the display screen of the electronic device, for determining the synthesizing frame rate of the electronic device according to the determining result, the computer program is executed by the processor to carry out following actions. The sum of the products is determined as the synthesizing frame rate of the electronic device.

In some implementations, if the sum of the products is greater than or equal to the maximum refresh rate of the display screen of the electronic device, for determining the synthesizing frame rate of the electronic device according to the determining result, the computer program is executed by the processor to carry out following actions. The maximum refresh rate of the display screen is determined as the synthesizing frame rate of the electronic device.

In some implementations, the computer program, when executed by the processor, further causes the processor to carry out following actions. A priority update instruction input in response to a user operation is received. The set priority of each of the target objects is updated according to the priority update instruction.

It should be understood that the implementation process will not be detailed herein and reference may be made to the foregoing method implementations.

Functional units in various implementations of the present disclosure may be integrated into one processing unit, or each unit may be physically present, or two or more units may be integrated into one unit. The above-mentioned integrated unit can be implemented in the form of hardware or a software function unit. Integrated unit may be stored in a computer readable storage medium when it is implemented in the form of a software functional unit and is sold or used as a separate product. For example, the integrated unit is stored in a memory of the electronic device and loaded and executed by at least one processor in the electronic device. The medium may include a read-only memory (ROM), a random access memory (RAM), a magnetic disk or compact disc, and so on. Each of the above devices or the electronic device can execute methods in the method implementations.

The method and device for controlling the frame rate of an electronic device, the storage medium, and the electronic device provided by the implementations of the present disclosure are described in detail. While the principle and implementation manners of the present disclosure have been described in conjunction with specific examples herein, and the description of the examples is only for helping to understand the method of the present application and its spirit. As will occur to those skilled in the art, the present disclosure is susceptible to various modifications and changes without departing from the spirit of the present disclosure. Therefore, the specification should not be construed as limiting the present disclosure.

What is claimed is:

1. A method for controlling a frame rate of a mobile terminal, the mobile terminal currently having a plurality of target objects running thereon, the target object comprising an application or a window, and the method comprising:
   for each of the plurality of target objects currently running on the mobile terminal,
      obtaining a frame rate of rendering of the each target object and a preset priority of the each target object;

determining a weight of the each target object according to the preset priority of the each target object; and
obtaining a product of the each target object by multiplying the frame rate of rendering of the each target object by the weight of the each target object;
determining a sum of products of the plurality of target objects as a synthesizing frame rate of the mobile terminal, the sum being smaller than a maximum refresh rate of a display screen of the mobile terminal; and
synthesizing, according to the synthesizing frame rate, a to-be-displayed image of the plurality of target objects currently running.

2. The method of claim 1, wherein obtaining the frame rate of rendering of each of the target objects currently running on the mobile terminal comprises:
obtaining, in a current running scenario, the frame rate of rendering of each of the target objects of the mobile terminal from a preset white list.

3. The method of claim 1, wherein obtaining the frame rate of rendering of each of the target objects currently running on the mobile terminal comprises:
obtaining, in a current running scenario, a real-time frame rate of rendering of each of the target objects currently running on the mobile terminal.

4. The method of claim 1, further comprising:
receiving a priority update instruction input in response to a user operation; and
updating the preset priority of each of the plurality of target objects according to the priority update instruction.

5. The method of claim 1, further comprising:
setting a refresh rate of a display screen of the mobile terminal to be the same as the synthesizing frame rate.

6. A mobile terminal, the mobile terminal currently having a plurality of target objects running thereon, the target object comprising an application or a window, and the mobile terminal comprising:
a memory;
a processor; and
computer programs, stored in the memory and configured to be executed by the processor;
the computer programs, when executed by the processor, being operable with the processor to:
for each of the plurality of target objects currently running on the mobile terminal,
obtain a frame rate of rendering of the each target object and a preset priority of the each target object;
determine a weight of the each target object according to the preset priority of the each target object, and
obtain a product of the each target object by multiplying the frame rate of rendering of the each target object by the weight of the each target object;
determine a sum of products of the plurality of target objects as a synthesizing frame rate of the mobile terminal, the sum being smaller than a maximum refresh rate of a display screen of the mobile terminal; and
synthesize, according to the synthesizing frame rate, a to-be-displayed image of the plurality of target objects currently running.

7. A device for controlling a frame rate of a mobile terminal, the mobile terminal currently having a plurality of target objects running thereon, the target object comprising an application or a window, and the device comprising:
a rendering-frame-rate obtaining module; configured to obtain, for each of the plurality of target objects currently running on the mobile terminal, a frame rate of rendering of the each target object and a preset priority of the each target object;
the rendering-frame-rate obtaining module further configured to determine, for each of the plurality of target objects currently running on the mobile terminal, a weight of the each target object according to the preset priority of the each target object;
a synthesizing-frame-rate determining module configured to obtain, for each of the plurality of target objects currently running on the mobile terminal, a product of the each target object by multiplying the frame rate of rendering of the each target object by the weight of the each target object;
the synthesizing-frame-rate determining modulefurther configured to determine a sum of products of the plurality of target objects as a synthesizing frame rate of the mobile terminal the sum being smaller than a maximum refresh rate of a display screen of the mobile terminal; and
a to-be-displayed image composing module, configured to synthesize, according to the synthesizing frame rate, a to-be-displayed image of the plurality of target objects currently running.

8. The device of claim 7, wherein the rendering-frame-rate obtaining module is configured to:
obtain, in a current running scenario, the frame rate of rendering of each of the target objects of the mobile terminal from a preset white list.

9. The device of claim 7, wherein the rendering-frame-rate obtaining module is configured to:
obtain, in a current running scenario, a real-time frame rate of rendering of each of the target objects currently running on the mobile terminal.

10. The device of claim 7, wherein the synthesizing-frame-rate determining module is configured to:
determine a frame rate of rendering of a target object with a highest priority as the synthesizing frame rate of the mobile terminal according to the frame rate of rendering and the preset priority of each of the target objects.

11. The device of claim 7, further comprising:
a priority-updating module, configured to receive a priority update instruction input in response to a user operation, and to update the preset priority of each of the plurality of target objects according to the priority update instruction.

12. The device of claim 7, further comprising:
a refresh-rate setting module, configured to set a refresh rate of a display screen of the mobile terminal to be the same as the synthesizing frame rate.

13. The mobile terminal of claim 6, wherein the computer programs are further operable with the processor to:
receive a priority update instruction input in response to a user operation; and
update the preset priority of each of the plurality of target objects according to the priority update instruction.

14. The mobile terminal of claim 6, wherein the computer programs are further operable with the processor to:
set a refresh rate of a display screen of the mobile terminal to be the same as the synthesizing frame rate.

* * * * *